United States Patent
Favaretto

(10) Patent No.: US 8,973,386 B2
(45) Date of Patent: Mar. 10, 2015

(54) ELECTRIC TRACTION VEHICLE WITH COOLING BY REFRIGERATION CYCLE

(75) Inventor: Fabrizio Favaretto, Via Gobetti (IT)

(73) Assignee: Ferrari S.p.A. (IT)

( * ) Notice: Subject to any disclaimer, the term of this patent is extended or adjusted under 35 U.S.C. 154(b) by 741 days.

(21) Appl. No.: 12/829,960

(22) Filed: Jul. 2, 2010

(65) Prior Publication Data

US 2011/0000241 A1    Jan. 6, 2011

(30) Foreign Application Priority Data

Jul. 2, 2009    (IT) .............................. BO2009A0427

(51) Int. Cl.
*B60H 1/32*    (2006.01)
*B60K 11/02*    (2006.01)
*B60L 3/00*    (2006.01)
(Continued)

(52) U.S. Cl.
CPC ............... *B60K 11/02* (2013.01); *B60L 3/0046* (2013.01); *B60L 11/1874* (2013.01); *F28D 15/0233* (2013.01); *H01M 10/5004* (2013.01); *H01M 10/5016* (2013.01); *H01M 10/5048* (2013.01); *H01M 10/5079* (2013.01); *H01M 10/5087* (2013.01); *B60L 2240/36* (2013.01); *H01M 10/5046* (2013.01); *H01M 10/5065* (2013.01); *H01M 10/5093* (2013.01); *Y02T 10/70* (2013.01); *Y02T 10/7005* (2013.01); *Y02T 10/705* (2013.01)
USPC ................... 62/243; 62/79; 62/244; 62/259.2; 180/65.1; 180/65.6

(58) Field of Classification Search
USPC .......... 62/244, 513, 243, 259.2, 506, 79, 333, 62/544; 180/65.1, 65.6
See application file for complete search history.

(56) References Cited

U.S. PATENT DOCUMENTS 4,007,315 A * 2/1977 Brinkmann et al. ............ 429/62
5,255,733 A * 10/1993 King .............................. 165/299
(Continued)

FOREIGN PATENT DOCUMENTS

DE          4408961 C1    3/1995
WO    WO-2008151087 A2    12/2008
(Continued)

OTHER PUBLICATIONS

"Italian Application Serial No. ITB020090427, Search Report dated Feb. 3, 2010", 3 pgs.

*Primary Examiner* — Mohammad M Ali
*Assistant Examiner* — Raheena Rehman
(74) *Attorney, Agent, or Firm* — Schwegman Lundberg & Woessner, P.A.

(57) ABSTRACT

An electric traction vehicle having: at least one pair of driving wheels; at least one reversible electric machine which can be mechanically connected to the driving wheels; an electronic power converter which pilots the electric machine; a storage system, which is aimed at storing electric energy, is connected to the electronic power converter and comprises at least one storage device; a passenger compartment; an air conditioning system of the passenger compartment which fulfills the function of regulating the temperature inside the passenger compartment; and a cooling system, which is completely independent and separate from the air conditioning system of the passenger compartment and uses a compression refrigeration cycle to cool at least one of the electric components, i.e. the electric machine, the electronic power converter and the storage system.

14 Claims, 8 Drawing Sheets

(51) Int. Cl.
*B60L 11/18* (2006.01)
*F28D 15/02* (2006.01)
*H01M 10/613* (2014.01)
*H01M 10/625* (2014.01)
*H01M 10/6552* (2014.01)
*H01M 10/6569* (2014.01)
*H01M 10/658* (2014.01)
*H01M 10/6551* (2014.01)
*H01M 10/6562* (2014.01)
*H01M 10/66* (2014.01)

(56) References Cited

U.S. PATENT DOCUMENTS

| | | | |
|---|---|---|---|
| 5,632,157 A | 5/1997 | Sekino et al. | |
| 5,719,444 A * | 2/1998 | Tilton et al. | 257/714 |
| 6,047,770 A * | 4/2000 | Suzuki et al. | 165/202 |
| 6,266,968 B1 * | 7/2001 | Redlich | 62/204 |
| 6,840,050 B2 * | 1/2005 | Pode | 62/3.61 |
| 2002/0073726 A1 * | 6/2002 | Hasebe et al. | 62/323.1 |
| 2004/0003607 A1 * | 1/2004 | Kadle et al. | 62/158 |
| 2004/0118142 A1 | 6/2004 | Hsu et al. | |
| 2006/0101837 A1 * | 5/2006 | Manole | 62/259.2 |
| 2009/0024256 A1 | 1/2009 | Adams et al. | |
| 2009/0107739 A1 * | 4/2009 | Major et al. | 180/53.8 |

FOREIGN PATENT DOCUMENTS

WO  WO 2008151087 A2 * 12/2008
WO  WO-2009119037 A1   10/2009

* cited by examiner

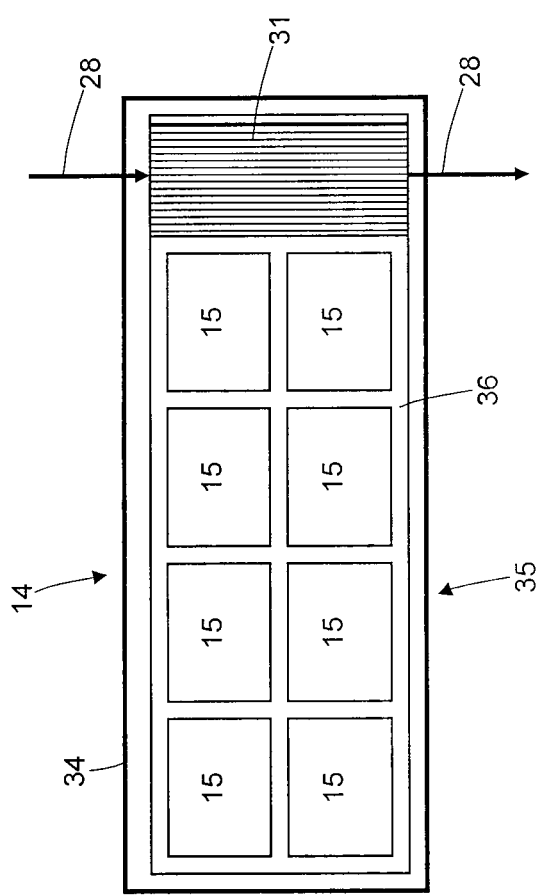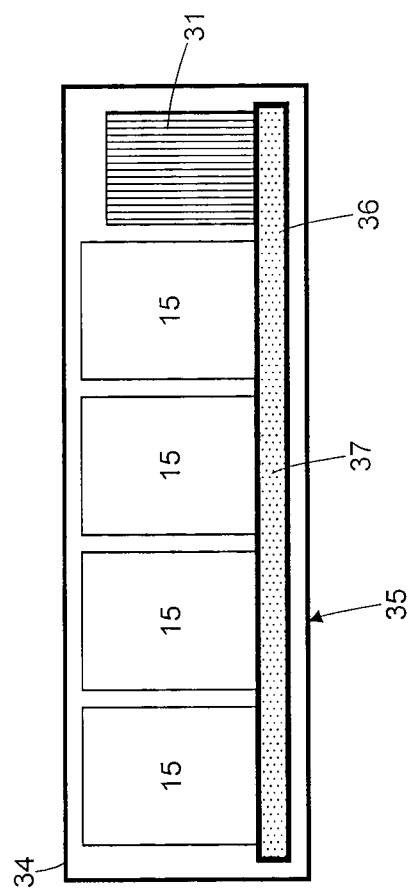

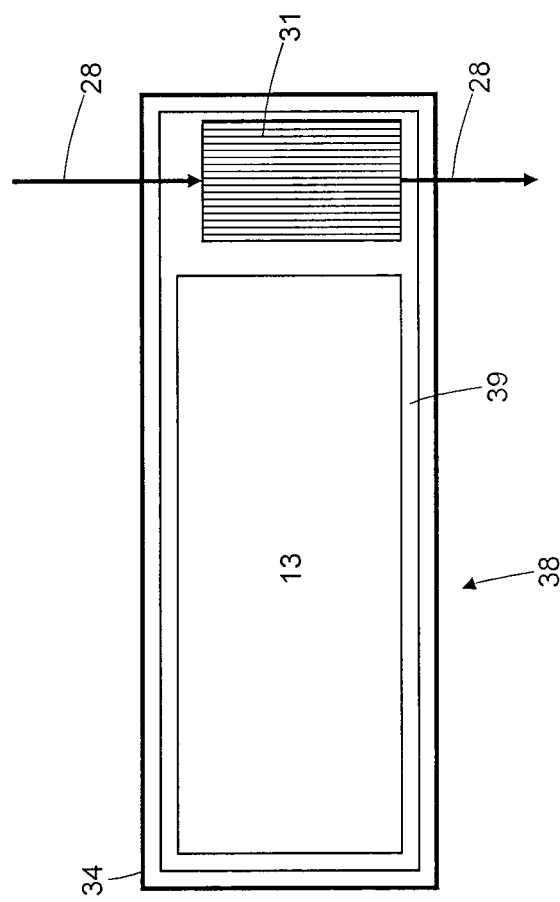
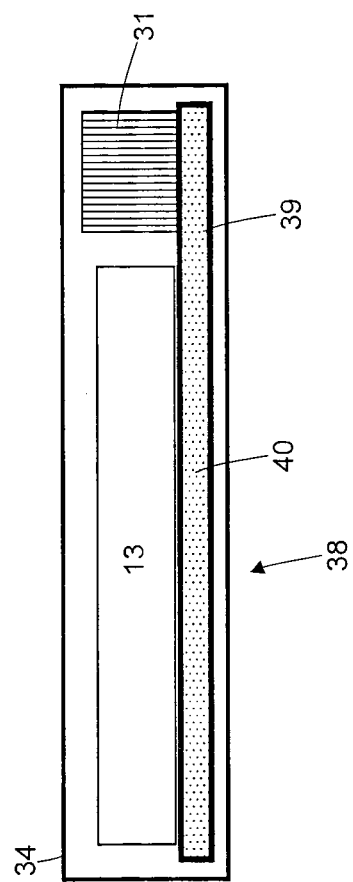

ELECTRIC TRACTION VEHICLE WITH COOLING BY REFRIGERATION CYCLE

RELATED APPLICATION

This application claims the benefit of priority, under 35 U.S.C. Section 119, to Italian Patent Application Serial No. BO2009A000427, filed on Jul. 2, 2009, which is incorporated herein by reference in its entirety.

TECHNICAL FIELD

At least one example relates to an electric traction vehicle.

At least one example is advantageously applied to a hybrid vehicle, to which explicit reference will be made in the following description without therefore loosing in generality.

BACKGROUND

A hybrid vehicle comprises an internal combustion engine, which transmits the torque to the driving wheels by means of a transmission provided with a gearbox, and at least one electric machine mechanically connected to the driving wheels; the electric machine is supplied by an electronic power converter connected to an electric storage system, typically consisting of a pack of chemical batteries, possibly connected in parallel to one or more super-capacitors.

In a hybrid vehicle, a cooling system is needed, which is dedicated to the electric components, i.e. the electric machine, the electronic power converter and the storage system, to avoid the electric components from overheating. With this regard, it is worth noting that, in use, all electric components are a source of electricity losses, which electricity is transformed into heat which thus should be appropriately disposed of.

Patent application US2004118142A1 describes using part of the cold generated by an air conditioning system of the passenger compartment to cool the electric components, i.e. the storage system, the electric machine, and the electronic power converter. However, using part of the cold generated by the air conditioning system of the passenger compartment has various drawbacks, because the electric components are generally arranged apart from the air conditioning system, and therefore long connection pipes, which should be appropriately insulated (and are therefore cumbersome), are needed. Moreover, because the generated cold is to be split between the cooling needs of the passenger compartment and the cooling needs of the electric components, it may occur that in case of particularly high temperatures, the available cold is insufficient for cooling the passenger compartment, and therefore passengers' comfort is compromised; in order to solve this drawback, the refrigerating power of the air conditioning system of the passenger compartment is to be increased, but such an increase is not always possible due to the limited space available for the air conditioning system of the passenger compartment. Finally, the optimal temperature of the cooling liquid for cooling the passenger compartment could be different (even very different) from the optimal temperature of the refrigeration liquid for cooling the electric components, and therefore it may be necessary to choose a compromise between the various needs for choosing the actual temperature of the cooling liquid.

Patent application WO2008151087A2 describes an electric vehicle provided with a cooling system of the storage system, which is completely independent and separate from the air conditioning system of the passenger compartment, and which may use a compression refrigeration cycle to cool the storage system itself.

Patent application US2009024256A1 describes a system for regulating the temperature of the storage system of an electric vehicle.

SUMMARY

Some examples provide an electric traction vehicle, which is free from the above-described drawbacks while being easy and cost-effective to be manufactured.

According to some examples, an electric traction vehicle is provided as claimed in the attached claims.

BRIEF DESCRIPTION OF THE DRAWINGS

The present invention will now be described with reference to the accompanying drawings, which illustrates some non-limitative embodiments thereof, in which:

FIG. 3 is a diagrammatic plan view, with parts removed for clarity, of a storage system of the vehicle in FIG. 1;

FIG. 4 is a diagrammatic section view, with parts removed for clarity, of the storage system in FIG. 3;

FIG. 5 is a diagrammatic plan view, with parts removed for clarity, of an electronic power converter of the vehicle in FIG. 1;

FIG. 6 is a diagrammatic section view, with parts removed for clarity, of the electronic converter in FIG. 5;

DETAILED DESCRIPTION

Figure 1:
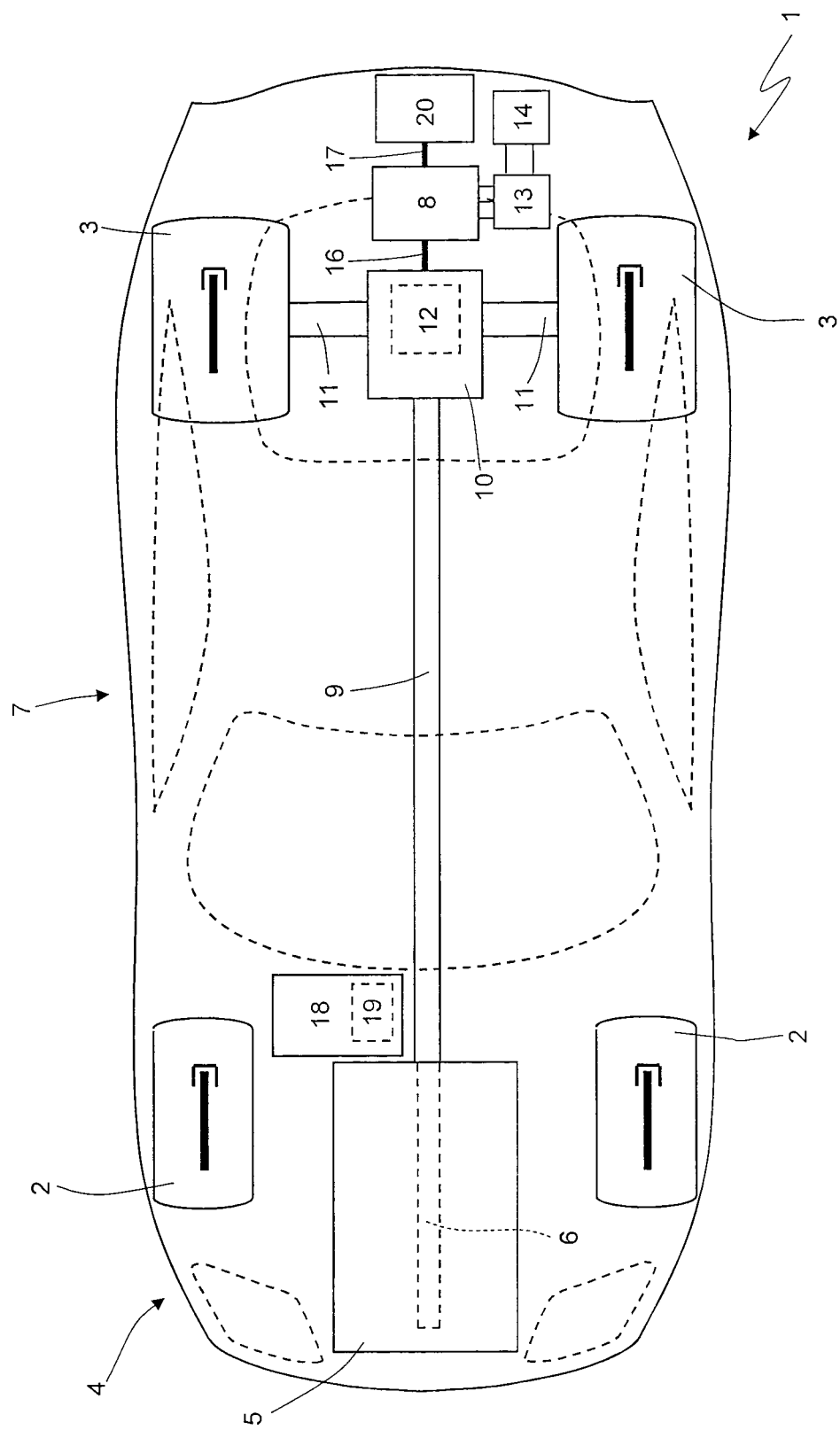
FIG. 1 is a diagrammatic perspective view, with parts removed for clarity, of a hybrid vehicle provided according to some examples.

In FIG. 1, numeral 1 indicates as a whole an electric traction hybrid vehicle provided with two front wheels 2 and two rear driving wheels 3, which receive the torque from a hybrid propulsion system 4.

The hybrid propulsion system 4 comprises an internal combustion thermal engine 5, which is arranged in a front position, and is provided with a drive shaft 6, a servo-controlled transmission 7 which transmits the torque generated by the internal combustion engine 5 to the rear driving wheels 3, and a reversible electric machine 8 (i.e. which may work as both electric motor, absorbing electricity and generating a mechanical torque, and as electric generator, absorbing mechanical energy and generating electricity), which is mechanically connected to the servo-controlled transmission 7.

The servo-controlled transmission 7 comprises a propeller shaft 9, which on one side is angularly integral with the drive shaft 6 and on the other side is mechanically connected to a gearbox 10, which is arranged in a rear position and transmits the motion to the rear driving wheels 3 by means of two axle shafts 11, which receive the motion from a differential 12. The reversible electric machine 8 is mechanically connected to the gearbox 10 and is piloted by an electronic power converter 13 connected to a storage system 14, which is aimed at storing electricity and comprises a series of storage devices 15 (shown in greater detail in FIGS. 3 and 4) consisting of chemical batteries and/or super-capacitors.

According to some examples, the gearbox 10 is of the double-clutch type, and comprises a primary shaft 16, which is elongated on the opposite side with respect to the clutches (i.e. on the opposite side with respect to the transmission shaft 9) so as to protrude from a gearbox to be coupled to a shaft 17 of the electric machine 8.

Vehicle 1 comprises a compartment which accommodates the passengers and an air conditioning system 18 of the passenger compartment, which fulfills the function of regulating the temperature inside the passenger compartment; for cooling and/or dehumidifying the passenger compartment, the air conditioning system uses a compression refrigeration cycle (i.e. a thermodynamic cycle capable of transferring heat from a low temperature environment to a higher temperature one), which exploits a compressor 19 actuated by the drive shaft 6 of the thermal engine 5 in a known manner.

Furthermore, vehicle 1 comprises a cooling system 20, which is completely independent and separate from the air conditioning system 18 of the passenger compartment, and uses a compression refrigeration cycle to cool the electric components, i.e. the electric machine 8, the electronic power converter 13 and the storage system 14.

Figure 2:
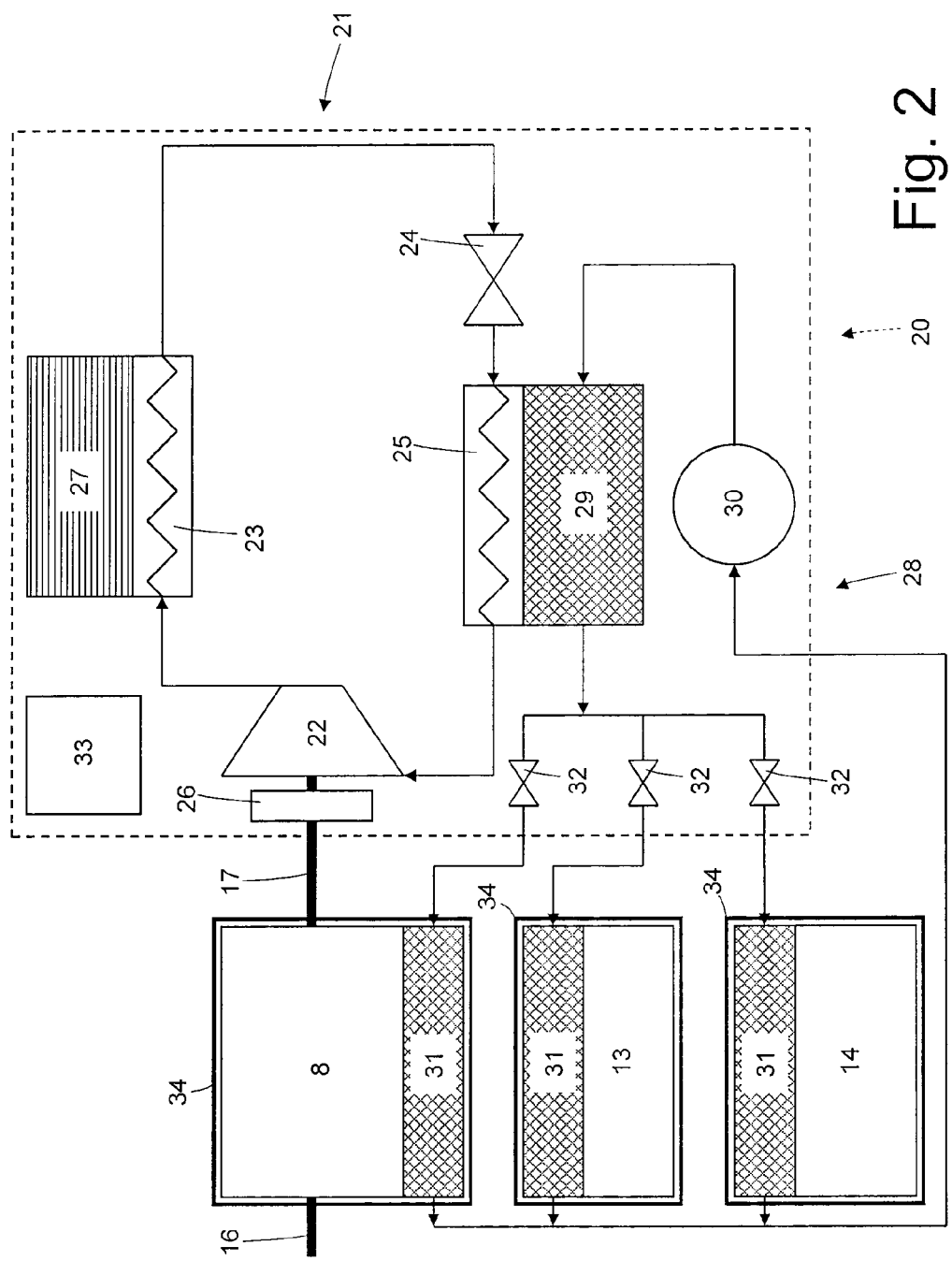
FIG. 2 is a diagrammatic view of a cooling system of the electric components of the hybrid vehicle in FIG. 1.

As shown in FIG. 2, the cooling system 20 comprises a refrigeration circuit 21, which implements a compression refrigeration cycle, contains a refrigeration fluid (e.g. HCFCs or hydrochlorofluorocarbons) and comprises in turn a compressor 22, a condenser 23, an expansion valve 24 (or lamination valve), and an evaporator 25. Compressor 22 is of the rotary type and directly actuated by the shaft 17 of the electric machine 8; according to an example, an electrically activated release device 26 is interposed between the compressor 22 of the cooling system 20 and the shaft 17 of the electric machine 8, which is piloted to selectively connect and disconnect the compressor 22 to and from the shaft 17 of the electric machine 8 so as not to feed the compressor 22 when cooling the electric components is not required (e.g. when the electric machine 8 is not used when travelling on highways at a constant speed, or when the electric components are already adequately cooled due to a low temperature of the external environment).

Condenser 23 is thermally coupled with an air radiator 27, which is hit by an air flow when vehicle 1 is moving, so as to disperse the heat present in the condenser 23 into the environment; according to an example, radiator 27 is also provided with an electric fan controlled by a thermostat for carrying out a forced cooling of the radiator 27 itself, if needed.

Moreover, the cooling system 20 comprises a cooling circuit 28, which contains a cooling fluid (typically water mixed with an antifreeze additive) and comprises, in turn, a heat exchanger 29 thermally coupled to the evaporator 25 for giving heat to the evaporator 25 itself, an electrically actuated circulation pump 30, and three heat exchangers 31, each of which is thermally coupled to a corresponding electric component to absorb the heat from the electric component itself. The three heat exchangers 31 are connected to one another in parallel and are connected in series to the heat exchanger 29 and to the circulation pump 30; an on-off solenoid valve 32 is arranged in series with each heat exchanger 31 and may be electrically regulated to vary the flow rate of the cooling fluid circulating through the heat exchanger 31 itself (from zero to a maximum value).

It is worth noting that the lower the temperature of the electric machine 8 and, although to a lesser extent, of the electronic power converter 13 (obviously within certain limits, particularly for the electronic components), the higher the efficiency because the lower the temperature of the conductors, the lower the electric resistance of the conductors themselves. Instead, the storage devices 15 (in particular, the chemical batteries) of the storage system 14 optimally work within a certain temperature range: if the storage devices 15 are too cold, their discharging capacity decreases (i.e. less energy is delivered), while auto-discharge (i.e. the energy which is lost due to processes within the storage devices 15) increases if the storage devices 15 are too hot; therefore, in order to maximize the efficiency and efficacy of the storage devices 15, the temperature of the storage devices 15 is to be controlled by heating them when they are too cold and by cooling them when they are too hot.

In use, a control unit 33 determines the temperature of each electric component by means of indirect estimates, e.g. based on electric resistance measurements or by means of a specific temperature sensor. According to the temperatures of the electric components, the control unit 33 decides whether to generate cold in the refrigeration circuit 21, and thus actuate the compressor 22 by piloting the release device 26 and connecting the compressor 22 to the shaft 17 of the electric machine 8. Furthermore, according to the temperatures of each electric component, the control unit 33 decides how much cooling fluid should pass through the corresponding heat exchanger 31 by regulating the respective on-off solenoid valve 32 and actuating the circulation pump 30.

When the temperature of the external environment is particularly low, the storage system 14 may need to be heated (at least at the start up, before the heat produced in use inside the storage system 14 has sufficiently increased the temperature of the storage system 14 itself). For this purpose, the control unit 33 could operate the refrigeration circuit as a heat pump so as to produce heat, which heats the cooling fluid 21 of the cooling circuit 28; in this circumstance, the on-off solenoid valves 32 of the electric machine 8 and of the power converter 13 are all closed so as to heat only the storage system 14.

According to an example, each electronic component is inserted into a thermally insulating case 34, which thermally insulates the electric component from the external environment so that the heat exchange with the external environment mainly occurs only through the heat exchanger 31; the heat exchanger 31 of each electric component should be obviously inserted into the thermally insulating case 34. Thereby, the electric components may be operated more efficiently (i.e. with less thermal dispersions) at a lower temperature than the environment temperature.

As shown in FIGS. 3 and 4, the storage system 14 comprises a heat pipe 35 which is flat in shape and consisting of a hollow body 36 made of heat conducting material (typically copper or aluminum), containing a small amount of refrigerant 37 (e.g. water, ethanol or ammonia) in liquid state, while the rest of the hollow body 36 is filled with the refrigerant vapor 37, so that no other gases are present. The heat pipe 35 transfers heat from a hot end to the other cold end by evaporating and condensing the refrigerant 37. The hot end in contact with a heat source, gives heat to the liquid refrigerant 37, which vaporizes and therefore increases the vapor pressure in the hollow body 36; moreover, the latent vaporization heat absorbed by the liquid refrigerant 37 decreases the temperature at the hot end. The pressure of the refrigerant 37 in vapor state near the hot end is higher than the balance at the cold end, therefore this pressure difference causes a very fast transfer of refrigerant 37 in vapor state to the cold end, where the refrigerant 37 in vapor state exceeding the balance condenses, giving heat to the cold end. The liquid refrigerant 37 thus flows back to the hot end: if the heat pipe 35 is vertically oriented (with the hot end downwards), the force of gravity could be sufficient, otherwise the capillarity of the walls of the hollow body 36, which are to be adequately shaped, is exploited. In other words, the inner walls of the hollow body 36 are made so as to favor the rising of the liquid refrigerant 37 by means of capillarity; this is carried out, for example, by applying metal powder by sintering on the inner walls of the hollow body 36 or by obtaining a series of longitudinal grooves on the inner walls of the hollow body 36.

An upper wall of the heat pipe 35 is arranged in contact with the storage devices 15 so as to favor a direct heat exchange (i.e. by conduction) between the heat pipe 35 and the storage devices 15; furthermore, the upper wall of the heat pipe 35 is arranged in contact with the heat exchanger 31 of the storage system 14, so as to favor a direct heat exchange (i.e. by conduction) between the heat pipe 35 and the heat exchanger 31.

A first function of the heat pipe 35 is to balance the temperature of the storage devices 15, i.e. to cause all storage devices 15 to have the same temperature; such a condition is particularly important in the case of chemical lithium batteries, because if a storage device 15 had a temperature higher than the others, it would undergo particularly high electrochemical strains, which could also cause irreparable damages. Furthermore, a second function of the heat pipe 35 is to transfer heat from one (hot) end at the storage devices 15 to the other (cold) end at the heat exchanger 31.

It is worth noting that the heat pipe 35 transfers heat in a very efficient manner, much more than a solid copper plate having the same section. Furthermore, the heat pipe 35 may be particularly thin (even only a few millimeters thick) and thus very light (being completely hollow). In an alternative simpler, less performing embodiment, the heat pipe 35 may be replaced by a similar solid plate made of heat conducting metal.

According to a possible embodiment, a layer of material which is heat conducting and electrically insulated is interposed between each storage device 15 and the upper wall of the heat pipe 35, so as to increase the electric insulation between the storage devices 15 and the heat pipe 35.

As shown in FIGS. 5 and 6, the electronic power converter 13 of the electric machine 8 comprises a heat pipe 38 which is flat in shape and consisting of a hollow body 39 made of heat conducting material (typically copper or aluminum), containing a small amount of refrigerant 40 (e.g. water, ethanol or ammonia) in liquid state, while the rest of the hollow body 39 is filled with vapor of refrigerant 40, so that no other gases are present. The heat pipe 38 is entirely similar to the heat pipe 35 described above, and therefore reference is to be made to the above description, with regards to the heat pipe 35 for a more detailed description of the heat pipe 38.

The electronic power converter 13 of the electric machine 8 and the heat exchanger 31 of the electronic power converter 13 rest against an upper wall of the hollow body 39. The function of the heat pipe 38 is to transfer heat from one (hot) end at the electronic power converter 13 to the other (cold) end at the heat exchanger 31.

Also in this case, in an alternative simpler, less performing embodiment, the heat pipe 38 may be replaced by a similar solid plate made of heat conducting metal. Moreover, according to a possible embodiment, a layer of material which is heat conducting and electrically insulated may be interposed between the electronic power converter 13 and the upper wall of the heat pipe 38, so as to increase the electric insulation between the electronic power converter 13 and the heat pipe 35.

In the embodiment shown in FIG. 2, a refrigeration circuit 21 is provided in which a refrigeration cycle to generate cold, and a refrigeration circuit 28, which is independent from the refrigeration circuit 21, receives cold from (i.e. gives heat to) the refrigeration circuit 21, and cools down the electric components. In other words, the refrigeration circuit 21 does not directly cool the electric components, but indirectly cools the electric components by interposing the refrigeration circuit 28. In the embodiment shown in FIG. 7, the cooling circuit 28 is missing and the refrigeration circuit 21 directly cools down the electric components; therefore, the refrigeration circuit 21 comprises three evaporators 25, which are connected to one another in parallel and are thermally coupled to the respective electric components. In other words, the evaporators 25 of the refrigeration circuit 21 replace the heat exchangers 31 and are directly thermally coupled to the electric components. In this embodiment, that shown in FIGS. 3-6 remains valid, obviously replacing the heat exchangers 31 crossed by the cooling fluid which circulates along the cooling circuit 28 with the evaporators 25 crossed by the refrigeration fluid which circulates along the refrigeration circuit 21; in particular, the on-off solenoid valves 32 are still present, fulfill the same function as described above with reference to the embodiment in FIG. 2, and are arranged in series upstream of the evaporators 25. The embodiment shown in FIG. 7 is simpler, therefore smaller in size and lighter, than the embodiment shown in FIG. 2 because it is free from the cooling circuit 28.

Figure 7:
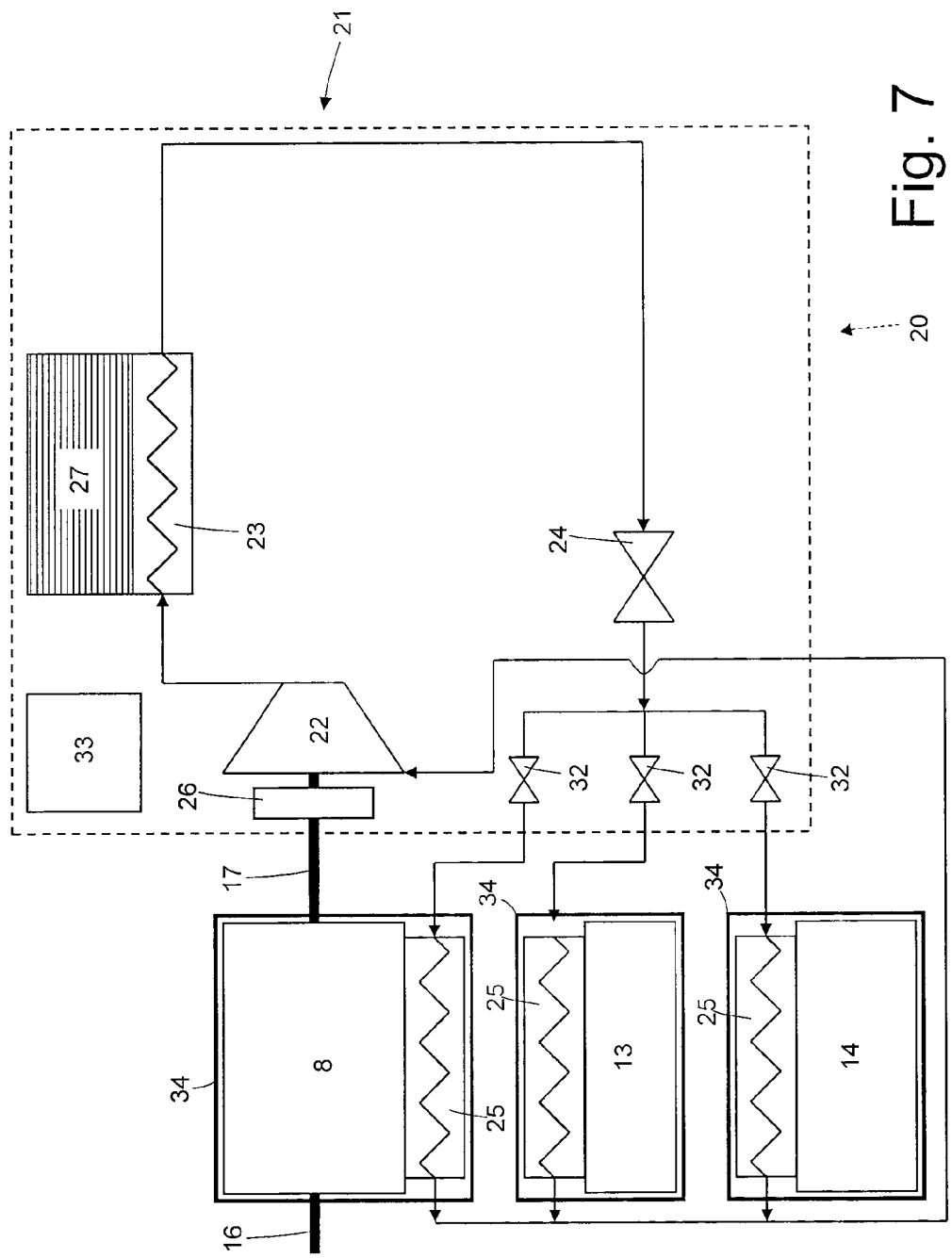
FIG. 7 is a diagrammatic view of an alternative embodiment of a cooling system of the electric components of the hybrid vehicle in FIG. 1.
Figure 8:
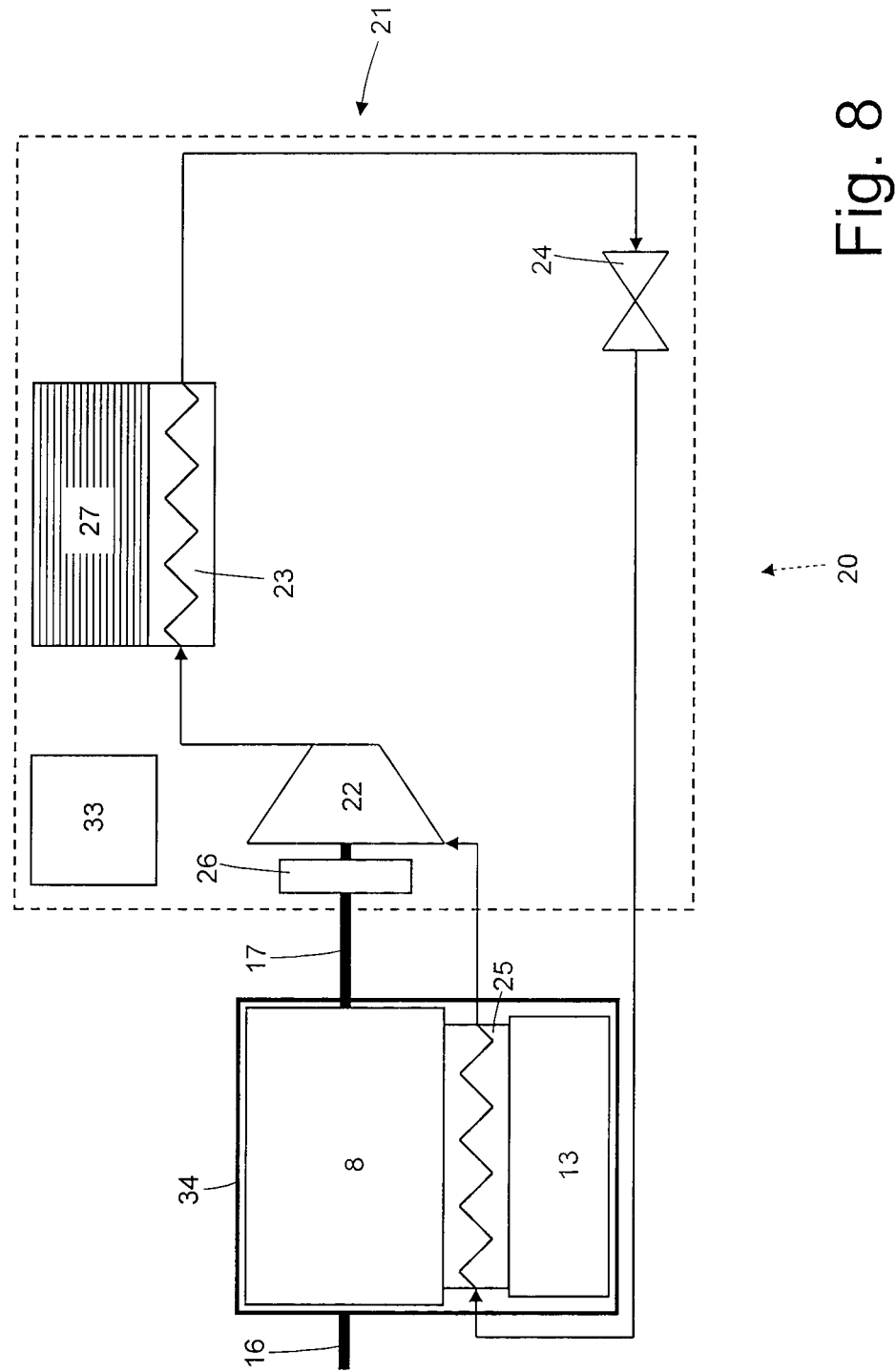
FIGS. 8, 9 and 10 are three different variants of the cooling system in FIG. 7.

In the variant shown in FIG. 8, the refrigeration circuit 21 directly cools down only the electric machine and the electronic power converter 13; in this variant, the electric machine 8 and the electronic power converter 13 are inserted into the same thermally insulating case 34 provided with only one common evaporator 25 and thus they substantially have the same temperature. According to a further variant (not shown) of the embodiment in FIG. 7, the evaporator 25 of the refrigeration circuit 21 is thermally coupled only to the electric machine 8 and thus it only cools the electric machine 8.

Figure 9:
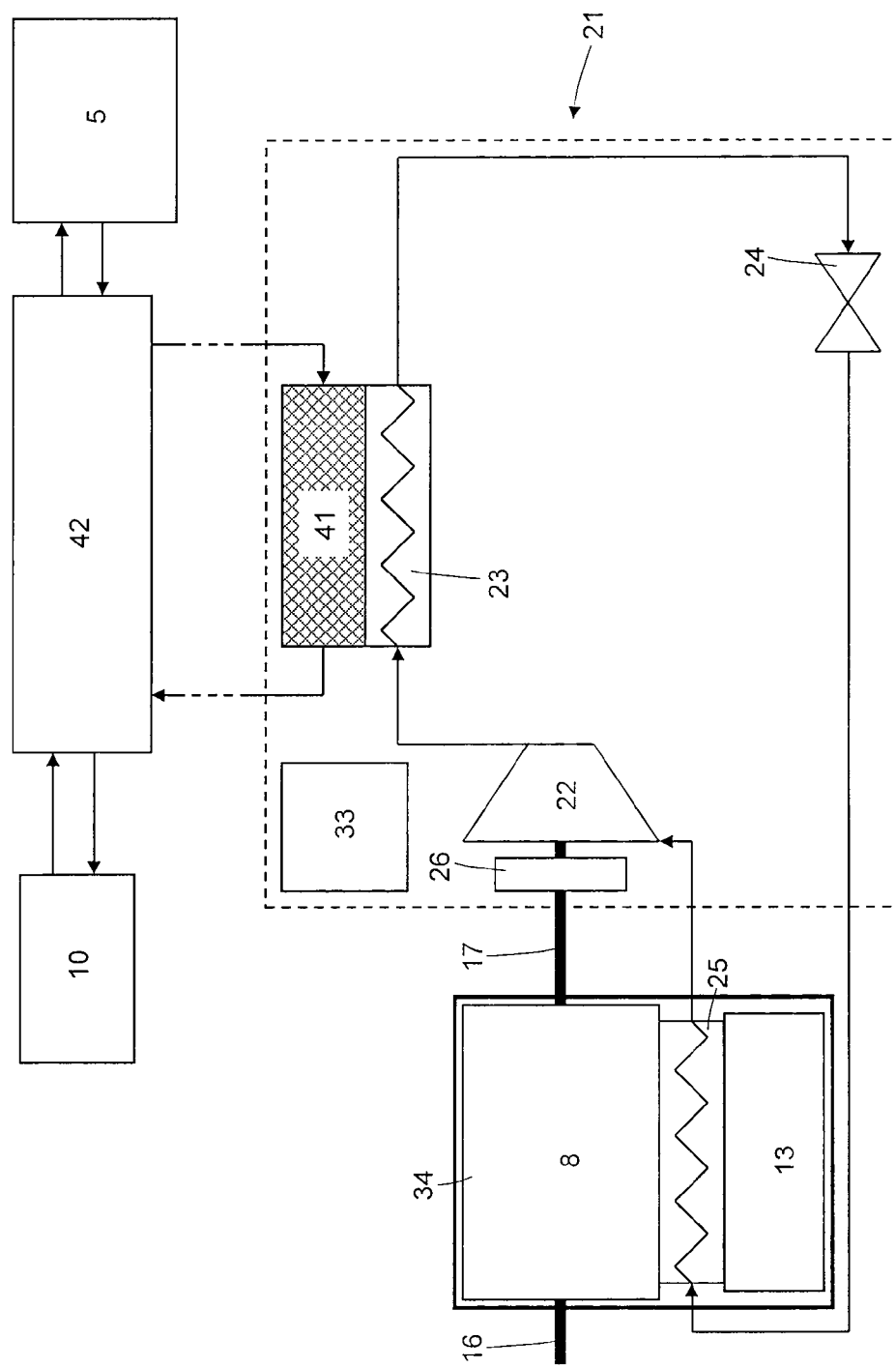

In the variant shown in FIG. 9, the air radiator 27 coupled with the condenser 23 of the refrigeration circuit 21 is replaced by a water-type heat exchanger 41, which is crossed (i.e. cooled) by a cooling liquid (typically water mixed with an antifreeze additive) of a cooling system 42 of the propulsions system 4, which cools down the thermal engine 5 and the gearbox 10. Such an embodiment has three advantages: the heat subtracted from the electric components may be used to heat the thermal engine 5 when engine 5 is off so as to keep the thermal engine 5 warm, the water-type heat exchanger 41 is a much smaller and more compact than the air radiator 27 with an appreciable decrease of the dimensions of the cooling system 20, and the water-type heat exchanger 41 does not need to be hit by an air flow when vehicle 1 is moving and therefore it is much simpler to be arranged with respect to the air radiator 27. In other words, in the embodiment shown in FIG. 9, the air radiator 27 coupled to the condenser 23 of the refrigeration circuit 21 is replaced by a water-type heat exchanger 41 crossed by the cooling liquid of the cooling system 42 of the propulsion system 4 so as to use the radiators of the cooling system 42, which are necessarily already present aboard vehicle 1.

Figure 10:
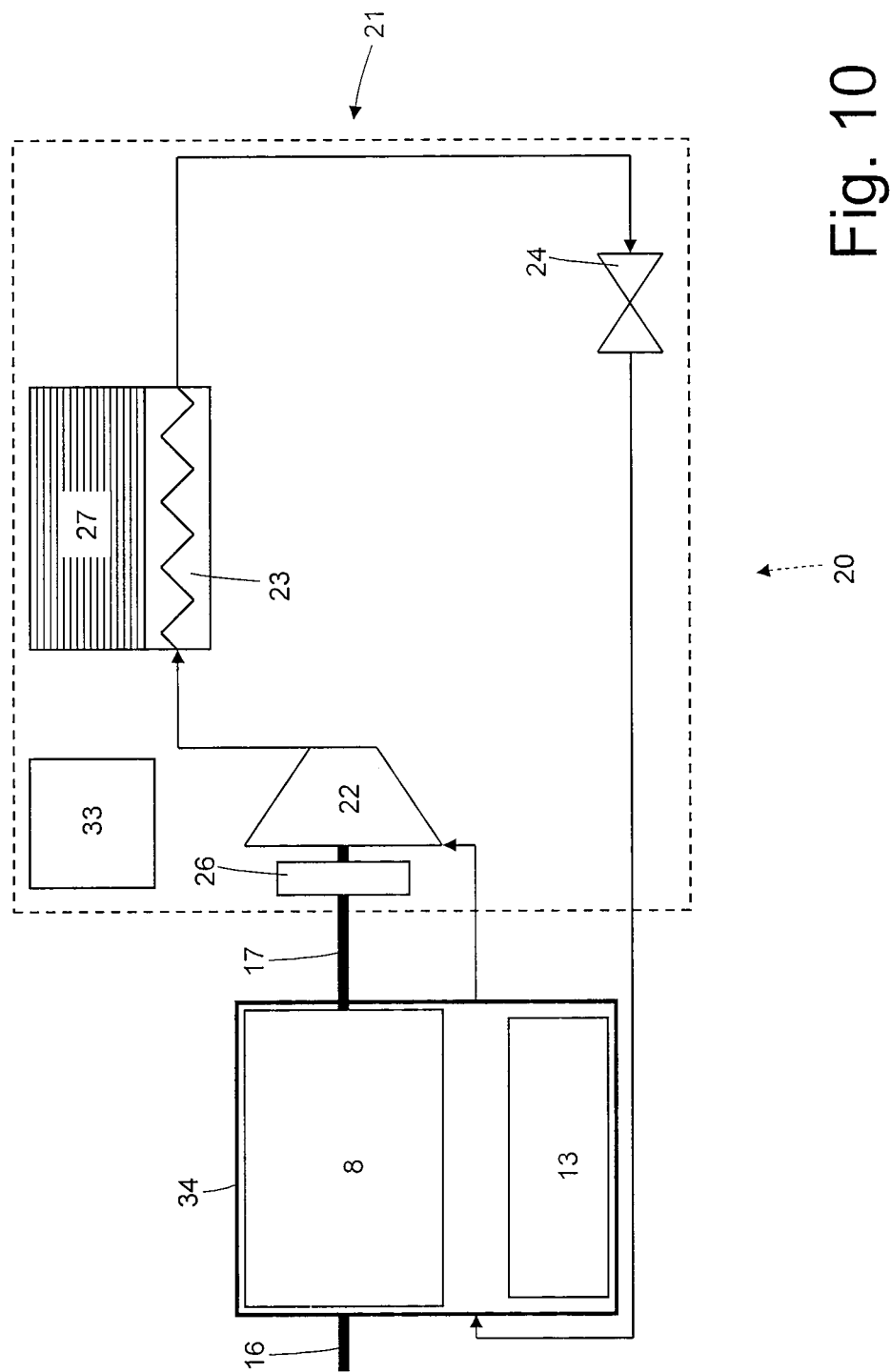

In the embodiments shown in FIGS. 7, 8 and 9, the evaporation of the refrigeration fluid in the refrigeration circuit 21 occurs within at least one specific evaporator 25 which is arranged, in turn, within a thermally insulating case 34, which is crossed by the refrigeration fluid of the refrigeration circuit 21 and determines an insulation between the refrigeration fluid and the electric components; in other words, the refrigeration fluid of the refrigeration circuit 21 does not come into direct contact with the electric components, but cools down the walls of evaporator 25, which in turn cool down the electric components. In the variant shown in FIG. 10, the evaporation of the refrigeration fluid in the refrigeration circuit 21 occurs within the thermally insulating case 34, which is fluid-tight and fulfills the functions of evaporator; i.e. the thermally insulating case 34 receives the refrigeration fluid from the expansion valve 24 and sends the refrigeration fluid to compressor 22, thus allowing the refrigeration fluid to evaporate therein directly subtracting heat from the electric components. In this embodiment, the refrigeration fluid of the refrigeration circuit 21 directly crosses, i.e. is in direct contact with, the electric components and therefore it cools the electric components themselves by direct contact (obviously the refrigeration fluid should be electrically insulating). Such a cooling mode is more efficient and effective, because the refrigeration fluid of the refrigeration circuit 21 penetrates within the electric components reaching all parts, even concealed, of the electric components themselves, but on the other hand it obliges to make the thermally insulating case 34 fluid-tight (with particular difficulties at the through openings of the primary shaft 16 of gearbox 10 and of the shaft 17 of the electric machine 8).

The above-described cooling system 20 has many advantages, as it is simple and cost-effective to be provided, has small overall dimensions and is especially capable of providing an efficient, effective cooling of all electric components in all possible operative circumstances without any negative effect on the air conditioning system of the passenger compartment of vehicle 1.

Furthermore, the above-described cooling system 20 allows to run the electric components (or at least some of the electric components) at a lower temperature than the ambient temperature with an even considerable increase of efficiency and specific power (i.e. the electric and/or mechanical power which may be developed per weight unit or per volume unit).

It is worth noting that the cooling system 20 is dedicated to the electric components only, therefore the cooling system 20 may be arranged very close to the electric components themselves, thus minimizing the length of the hydraulic pipes. Moreover, the cooling system 20 being dedicated to the electric components only, the effective temperature of the refrigeration fluid and/or of the cooling fluid may be only chosen according to the cooling needs of the electric components themselves.

The invention claimed is:

1. An electric traction vehicle comprising:
   at least one pair of driving wheels;
   at least one reversible electric machine which is capable of being mechanically connected to the driving wheels;
   an electronic power converter operatively coupled to the electric machine;
   a storage system which is capable of storing electric energy, is connected to the electronic power converter and comprises a plurality of storage devices;
   a passenger compartment;
   an air conditioning system of the passenger compartment which is capable of regulating the temperature inside the passenger compartment; and
   a cooling system which is completely independent and separate from the air conditioning system of the passenger compartment, uses a compression refrigeration cycle to cool at least one of the electric machine, the electronic power converter and the storage system, and comprises a compressor which is actuated directly by a shaft of the electric machine;
   wherein the cooling system comprises a refrigeration circuit containing a refrigeration fluid and comprising the compressor, a condenser, an expansion valve and at least one evaporation element which is thermally coupled to at least one electric component;
   wherein the storage system comprises a first heat pipe which has a flat shape and includes a hollow body made of heat conducting metal containing a small quantity of refrigerant in liquid state, while the rest of the hollow body is filled with the vapor of the refrigerant; and
   wherein a flat wall of the first heat pipe is located in contact with a wall of each storage device and is also located in contact with an evaporator crossed by the cooling fluid circulating along the refrigeration circuit or with a first heat exchanger crossed by the cooling fluid circulating along the cooling circuit.

2. The electric traction vehicle according to claim 1, wherein an electrically activated release device is interposed between the compressor of the cooling system and the shaft of the electric machine.

3. The electric traction vehicle according to claim 1, wherein the refrigeration circuit comprises:
   at least two evaporation elements, each of which is thermally coupled to a corresponding electric component; and
   for each evaporation element an on-off solenoid valve which regulates the flow of the refrigeration fluid through the evaporation element.

4. The electric traction vehicle according to claim 1, wherein the refrigeration circuit comprises an air radiator which is hit by an air flow when the vehicle is in motion and is thermally coupled to the condenser.

5. The electric traction vehicle according to claim 1, wherein the cooling system comprises a cooling circuit containing a cooling fluid and comprising in turn a second heat exchanger, which is thermally coupled to the evaporation element, a circulation pump and at least one third heat exchanger, which is thermally coupled to a corresponding electric component.

6. The electric traction vehicle according to claim 5, wherein the cooling circuit comprises:
   at least two third heat exchangers, each of which is thermally coupled to a corresponding electric component; and
   for each third heat exchanger an on-off solenoid valve to regulate the flow of the cooling fluid through the third heat exchanger itself.

7. The electric traction vehicle according to claim 1, wherein the electronic power converter comprises a second heat pipe which has a flat shape and includes a hollow body made of heat conducting metal containing a small quantity of refrigerant in liquid state, while the rest of the hollow body is filled with the vapor of the refrigerant; and a flat wall of the second heat pipe is located in contact with the electronic power converter and is located in contact with an evaporator crossed by the cooling fluid circulating along the refrigeration circuit or with a fourth heat exchanger crossed by the cooling fluid circulating along the cooling circuit.

8. The electric traction vehicle according to claim 1, wherein the electric component is in a thermally insulating case which thermally insulates the electric component from the external environment and houses the evaporator so that the exchange of heat with the external environment takes place prevalently through the evaporator.

9. The electric traction vehicle according to claim 1,
   wherein the refrigeration circuit comprises a second heat exchanger which is crossed by a cooling liquid of first-cooling system of a thermal engine of the vehicle and is thermally coupled to the condenser.

10. The electric traction vehicle according to claim 1, wherein the evaporation element comprises an evaporator which is physically separated from the electric component, is thermally coupled to the electric component and determines a fluid-tight insulation between the refrigeration fluid and the electric component.

11. The electric traction vehicle according to claim 1, wherein the electric component is in a thermally insulating case which thermally insulates the electric component from the external environment, receives the refrigeration fluid from the expansion valve and sends the refrigeration fluid to the compressor, and constitutes the evaporator element.

12. The electric traction vehicle according to claim 11, wherein the electric machine and the electronic power converter are inside a same common thermally insulating case.

13. The electric traction vehicle according to claim 1, wherein the electric component is in a thermally insulating case which thermally insulates the electric component from the external environment and houses at least one of the evaporator of the refrigeration circuit or the first heat exchanger of the cooling circuit, so that the exchange of heat with the external environment takes place prevalently through the evaporator or through the first heat exchanger.

14. The electric traction vehicle according to claim 10, wherein a layer of material which is heat conducting and electrically insulated is interposed between each storage device and the flat wall of the first heat pipe.

* * * * *